United States Patent
Cheng

(10) Patent No.: US 8,205,096 B2
(45) Date of Patent: Jun. 19, 2012

(54) SOFTWARE LICENSE EMBEDDED IN SHELL CODE

(75) Inventor: Peter Cheng, Beijing (CN)

(73) Assignee: Safenet, Inc., Belcamp, MD (US)

( * ) Notice: Subject to any disclaimer, the term of this patent is extended or adjusted under 35 U.S.C. 154(b) by 359 days.

(21) Appl. No.: 12/663,785

(22) PCT Filed: Oct. 12, 2009

(86) PCT No.: PCT/CN2009/001133
§ 371 (c)(1), (2), (4) Date: Dec. 9, 2009

(87) PCT Pub. No.: WO2011/044710
PCT Pub. Date: Apr. 21, 2011

(65) Prior Publication Data
US 2011/0191593 A1    Aug. 4, 2011

(51) Int. Cl.
*G06F 12/14*    (2006.01)
(52) U.S. Cl. .......................................... 713/189; 726/26
(58) Field of Classification Search .................. 713/189; 726/26
See application file for complete search history.

(56) References Cited

U.S. PATENT DOCUMENTS

| 6,141,698 | A | 10/2000 | Krishnan et al. | |
| 6,434,535 | B1 * | 8/2002 | Kupka et al. | 705/24 |
| 6,463,538 | B1 * | 10/2002 | Elteto | 713/190 |
| 6,557,105 | B1 * | 4/2003 | Tardo et al. | 713/193 |
| 2007/0174571 | A1 | 7/2007 | Elteto | |
| 2009/0138863 | A1 | 5/2009 | Lu et al. | |

FOREIGN PATENT DOCUMENTS

CN    101158911 A    4/2009

* cited by examiner

*Primary Examiner* — Cordelia Zecher
(74) *Attorney, Agent, or Firm* — Drinker, Biddle & Reath LLP

(57) ABSTRACT

Software application protection methods and systems for protecting and verifying licensing of an original application. The system reads the original application executable, and generates a shelled application comprising the original application and a shell containing the license information. The shelled application implements license APIs, and establishes secure communications within the shelled application between the original application and the shell. Licensing for the original application can be verified by the shelled application alone.

16 Claims, 8 Drawing Sheets

```
SHELL_CRYPT_BEGIN
MessageBox(NULL, "shell sdk test", MB_OK | MB_ICONINFORMATION);
SHELL_CRYPT_END
```

FIG. 1

```
004013A2    E8 DA570A00       call    004A6B81              ; The following codes are invalid
004013A7    1B00              sbb     eax, dword ptr [eax]
004013A9    0000              add     byte ptr [eax], al
004013AB    08FD              or      ch, bh
004013AD    C7                ???                           ; Unknown command
004013AE    DD5A B8           fstp    qword ptr [edx-48]
004013B1    0ABD 3B2E0A6D     or      bh, byte ptr [ebp+6D0A2E3B]
004013B7    8934C2            mov     dword ptr [edx+eax*8], esi
004013BA    E6 F1             out     0F1, al
004013BC    238CA1 F3440A8B   and     ecx, dword ptr [ecx+8B0A44F3]
```

FIG. 2A

```
004013A2    E8 DA570A00       call    004A6B81              ; Decrypt
004013A7    1B00              sbb     eax, dword ptr [eax]
004013A9    0000              add     byte ptr [eax], al
004013AB    086A 40           or      byte ptr [edx+40], ch
004013AE    68 20304000       push    00403020              ; ASCII "shell sdk test"
004013B3    6A 00             push    0
004013B5    8B4D FC           mov     ecx, dword ptr [ebp-4]
004013B8    E8 11040000       call    004017CE              ; jmp to MessageBoxA
004013BD    E8 F9990A00       call    004AADBB              ; Encrypt it again
```

FIG. 2B

| Feature Data ||||||||
|---|---|---|---|---|---|---|---|
| 0 | 1 | 2 | 3 | 4 | 5 | 6 | 7~255 |
| Type | Feature ID || Length || Check Mark || Value |

FIG. 8

| Type | | Description |
|---|---|---|
| Locking Constraint | 0 | User name |
| | 1 | System partition volume serial number |
| | 2 | Network card MAC address |
| | 3 | Host name |
| | 4 | IP address |
| | 5 | Processor ID |
| | 6 | OS install date/time |
| | 7 | USB mass storage (disk) type or serial number |
| | 8 | Physical disk type or serial number (both SCSI and EIDE) |
| | 9 | Video card type |
| | 10 | Physical memory (RAM) size |
| | 11 | Client time zone |
| Environment Constraint | 12 | Virtual machine detection |
| | 13 | Terminal Service detection |
| | 14 | Debuggers detection |
| Trial Constraint | 15 | Begin date |
| | 16 | End date |

FIG. 9

SCL_OpenLicense
*Format:* SCL_STATUS SCL_OpenLicense(
SCL_DWORD           licID,
SCL_DWORD           securetunelfeatureID,
SCL_BYTE            publicKey,
SCL_DWORD           flags,
SCL_HANDLE          licHandle )

SCL_FeatureQuery
*Format:* SCL_STATUS SCL_FeatureQuery(
SCL_HANDLE          licHandle,
SCL_DWORD           featureID,
SCL_DWORD           flags,
SCL_BYTE            query,
SCL_DWORD           queryLength,
SCL_BYTE            response,
SCL_DWORD           responseLength )

SCL_FeatureRead
*Format:* SCL_STATUS SCL_FeatureRead(
SCL_HANDLE          licHandle,
SCL_DWORD           featureID,
SCL_VOID            buffer,
SCL_DWORD           offset,
SCL_DWORD           length )

SCL_FeatureEncrypt
*Format:* SCL_STATUS SCL_FeatureEncrypt(
SCL_HANDLE          licHandle,
SCL_DWORD           featureID,
SCL_BYTE            plainBuffer,
SCL_BYTE            cipherBuffer )

FIG. 10A

SCL_FeatureDecrypt
*Format:*  SCL_STATUS  SCL_FeatureDecrypt(
                 SCL_HANDLE            licHandle,
                 SCL_DWORD             featureID,
                 SCL_BYTE              cipherBuffer,
                 SCL_BYTE              plainBuffer )

SCL_FeatureVerify
*Format:*  SCL_STATUS  SP_API  SCL_FeatureVerify(
                 SCL_HANDLE            licHandle,
                 SCL_BYTE              publicKey,
                 SCL_BYTE              signBuffer,
                 SCL_DWORD             length,
                 SCL_BYTE              signResult )

SCL_FeatureSign
*Format:*  SCL_STATUS  SCL_FeatureSign(
                 SCL_HANDLE            licHandle,
                 SCL_DWORD             featureID,
                 SCL_BYTE              signBuffer,
                 SCL_DWORD             length,
                 SCL_BYTE              signResult )

SCL_CloseLicense
*Format:*  SCL_STATUS  SCL_CloseLicense(
                 SCL_HANDLE            licHandle )

FIG. 10B

SOFTWARE LICENSE EMBEDDED IN SHELL CODE

BACKGROUND

1. Field of the Invention

The present invention relates to systems and methods for protecting software from unauthorized copying and/or execution, and in particular to a system and method that protects software via shell code that contains embedded license information and/or that communicates with a protected application via a secure tunnel.

2. Description of the Related Art

Software piracy is an ongoing problem for software vendors. Many techniques for discouraging software piracy have been developed, and products incorporating those techniques are available for use by software vendors to secure their software applications from unauthorized copying and/or use.

One software application protection technique uses link-in modules that require the developer to modify the original application code to call specific functions, for example, functions that check for license conditions. Another protection technique is called shelling. Shelling ordinarily does not require changes to the application code. With the shelling technique, a shell generating process reads the original application executable and produces a modified, new executable as a so-called shelled application which contains an "outer layer" of protection code that encapsulates the original application. Further, when shelling is used, one or more application sections, such as executable code, data, import tables, resources, and the like, can be protected via encryption and/or compression when the shell code is generated, and the shell makes the protected code sections available as needed when the protected application runs.

One function typically performed by the shell is to confirm that a valid license for the application exists. For example, a traditional shell-based application protection solution will typically pack the protected application with shell code that stores license or key information in a storage location separate from the protected application. The licensing information can be stored in a registry, database, file, hidden disk sector, or the like. One or more application programming interfaces (APIs) are provided to access the license information, and the shell code can call the APIs to verify that the protected application is properly licensed.

One vulnerability inherent in shelling is that the software application program protection is provided only by the outer layer of protection. Consequently, a cracker may be able to gain access to the protected application by cracking only the outer layer of protection. When the shelled application launches, the shell code executes before the original application code, and code execution usually proceeds in a fixed, identifiable pattern. A cracker can follow the code execution (for example, by running the shelled program under a debugger), and once the code execution sequence is understood, the cracker can modify the code (for example, by patching the shelled application executable) to bypass and/or disable license checking.

Link-in modules and shelling can also be used together. For example, in one scenario the shell code can be appended to the encrypted and/or compressed application sections. When the shelled application first executes, the shell initially gains control and can perform security-related functions such as checking application integrity, checking for the presence of a debugger, decrypting and/or decompressing application sections, and initializing application processes such as import functions and relocation tables, before passing control to the application. The original application code can also be modified to redirect some system APIs to the shell code. The application can then continue to interact with the shell code after control is transferred to the application. Furthermore, self-modifying code functions can be provided by the shell whereby, for example, certain application code snippets are encrypted at runtime, and the shell code can decrypt those code snippets before they are executed, and encrypt them again after executing.

However, in solutions that utilize shelling, the application code and the shell code of the shelled application reside in different sections of memory having identifiably different addresses. Prior art shelling solutions do not mask the difference between application code addresses and shell code addresses. A cracker may therefore be able to unpack the protected application code and determine which code is part of the shell, and which is part of the application the shell protects. If so, the cracker may then be able to remove or modify the link between shell code and application code. For example, encryption and decryption of code during program execution can be disabled by using no-operation (NOP) instructions to replace decrypt and encrypt instructions.

FIG. 1 shows an example of a traditional self-modifying code feature being implemented. As shown, two macros are used by the packing tool to locate the code to be protected, SHELL_CRYPT_BEGIN, and SHELL_CRYPT_END. After compiling and packing, the disassembled code will be shown in FIGS. 2A and 2B.

After the application is compiled, the protective shell code is generated and a shelled application executable is generated. The shelled application executable can then be examined by a cracker using a debug tool, such as OllyDbg, for example, to disassemble the shelled application executable, or binary code. OllyDbg is a debugger that emphasizes binary code analysis. It traces registers, recognizes procedures, API calls, switches, tables, constants, and strings, and locates routines from object files and libraries. Such tools can be used to reverse engineer and crack programs.

FIG. 2A shows an illustrative snippet of such disassembled code. Program addresses are shown at the beginning of each line, and all have the format 0040XXXX. The code at address 004013A2 calls the code at address 004A6B81 (top line of code) to decrypt the subsequent lines of code. After executing the code at address 004013A2, the code is changed as shown in FIG. 2B. It is apparent that the called addresses 004A6B81 and 004AADBB (underlined in the call statements at lines 004013A2 and 004013BD in FIGS. 2A and 2B) are located in different address sections than the program code addresses that are indicated at the beginning of each line of code, i.e., at addresses 0040XXXX. A cracker could surmise that address locations of the form 0040XXXX belong to the application code address space, while address locations of the form 004AXXXX belong to the shell code address space.

Different code sections are illustrated in FIG. 3, wherein different blocks indicate code sections located in different address spaces. As shown, the address spaces of the different code sections have identifiable boundaries. Illustratively, during program execution the shell code can decrypt and encrypt sections of application code as needed, thereby enhancing the security of the application code. Even so, a cracker might be able to analyze the program, recognize the existence of the decryption and encryption shell processes, and remove the link between the shell code and the application code, for example, by using no-operation (NOP) instructions to replace the encryption instructions. Similarly, a cracker might be able to recognize the existence of license checking processes, and remove the link between the shelled application code and the license information stored outside of the shelled application.

Accordingly, there is a need for an application protection technique that resists cracking by making it more difficult for a cracker to disable license checking and/or modify communications between application code and shell code.

SUMMARY

Embedding application software license information in a shell, and securing communications between the shell and the application code of a shelled application, are disclosed. The license can be embedded in the shell code during the shell generating process. A set of application programming interfaces (APIs) can be provided in the shell and the application can be modified to interact with the APIs to access the license information. The application code and the shell code can communicate using a secure tunnel to strengthen the security of the communication link between them.

It is to be understood that both the foregoing general description and the following detailed description are exemplary and explanatory and are intended to provide further explanation of the invention as claimed.

BRIEF DESCRIPTION OF THE DRAWINGS

The accompanying figures are included to provide a further understanding of the invention, and to present exemplary embodiments and illustrative features of the invention. Together with the description, the figures serve to help explain the principles of the invention, the scope of which is defined by the appended claims.

In the drawings:

FIG. 1 shows code for initiating the generation of a protective shell.

FIGS. 2A and 2B show the modification of shelled application code as a shelled application executes.

FIG. 8 illustrates an exemplary license constraint element.

FIG. 9 illustrates exemplary constraint types and descriptions.

FIGS. 10A and 10B provide illustrative names and formats of exemplary shell license application programming interface (API) functions that can be called by the application to access the licensing information embedded in the shell code.

DETAILED DESCRIPTION

Figure 4:
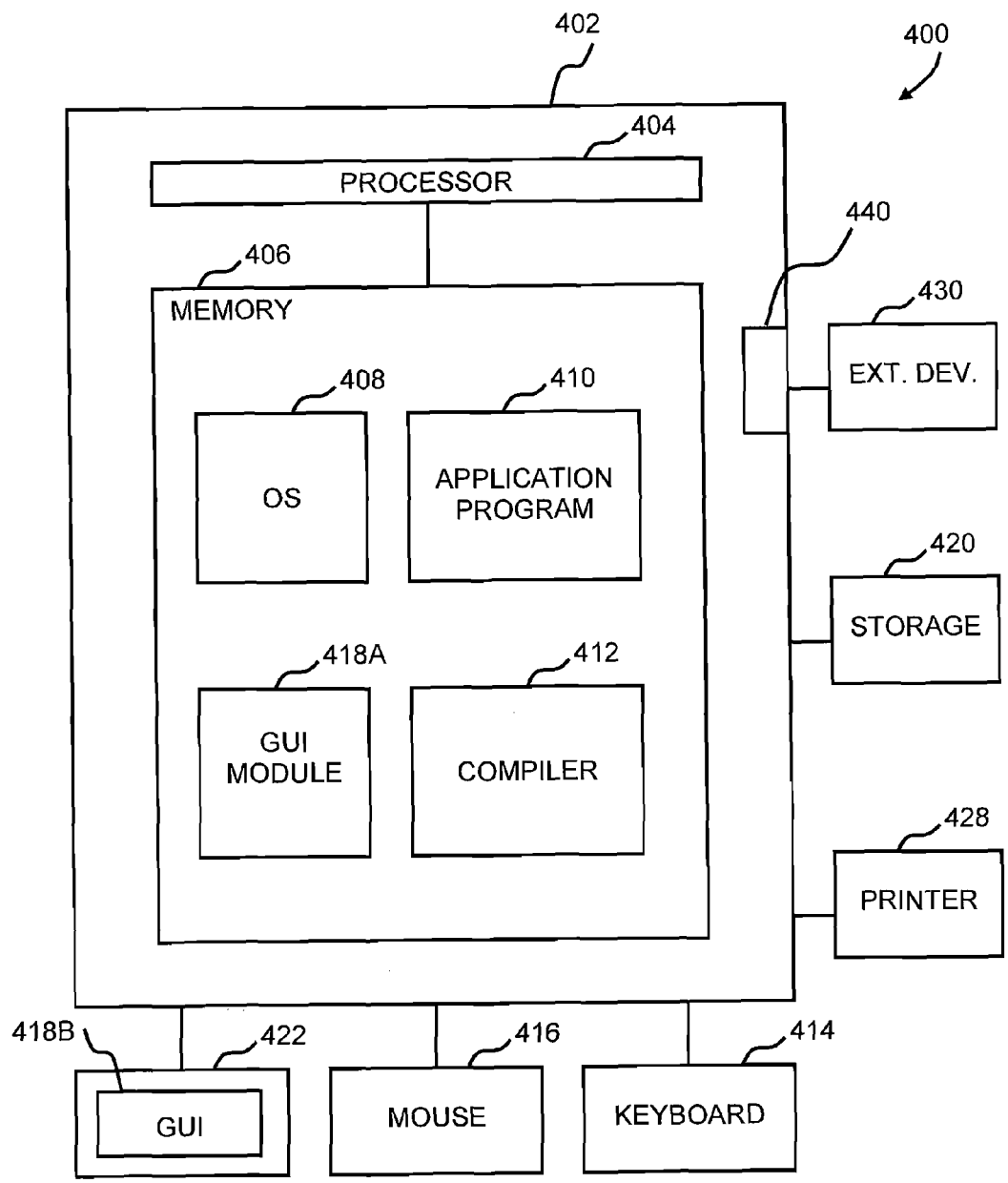
FIG. 4 is a block diagram showing an exemplary hardware environment for practicing the herein disclosed systems and methods.

FIG. 4 illustrates an exemplary computer system 400 that could be used to implement the herein disclosed systems and methods. Computer 402 comprises a processor 404 and a memory, such as random access memory (RAM) 406. The computer 402 is operatively coupled to a display 422, which presents images such as windows to the user on a graphical user interface (GUI) 418B. The computer 402 may be coupled to other devices, such as a keyboard 414, a mouse 416, a printer 428, etc. Those skilled in the art will recognize that any combination of the above components, peripherals, and other devices, may be used with the computer 402.

Generally, the computer 402 operates under the control of an operating system 408 stored in the memory 406, and interfaces with the user to accept inputs and commands and to present results through a graphical user interface (GUI) module 418A. Although the GUI module 418A is depicted as a separate module, the instructions performing the GUI functions can be resident or distributed in the operating system 408, the computer program 410, or implemented with special purpose memory and processors. The computer 402 also implements a compiler 412 which allows an application program 410 originally written in a programming language such as C, C++, Visual Basic, Delphi, or other programming language, to be compiled (translated) into processor 404 readable code. After completion, the compiled application 410 accesses and manipulates data stored in the memory 406 of the computer 402 using relationships and logic that were generated using the compiler 412. The computer 402 also optionally comprises a communication device 440 such as a modem, network card, or other device for communicating with external devices 430 such as other computers, storage devices, etc.

In an embodiment, instructions implementing the operating system 408, the computer program 410, and the compiler 412 are tangibly embodied in a computer-readable storage medium, e.g., data storage device 420, which could include one or more fixed or removable data storage devices, such as a hard drive, an optical disk drive, flash drive, tape drive, or the like. Further, the operating system 408 and the computer program 410 comprise instructions which, when read and executed by the computer 402, cause the computer 402 to perform the steps necessary to implement and/or use the herein disclosed systems and methods. Computer program 410 and/or operating system 408 instructions may also be tangibly embodied in memory 406, data storage device 420, and/or external device 430, thereby making a computer program product or article of manufacture according to the herein disclosed systems and methods. As such, the terms "article of manufacture," "program storage device," and "computer program product" as used herein are intended to encompass a computer program accessible from any computer readable device or storage medium.

Figure 3:
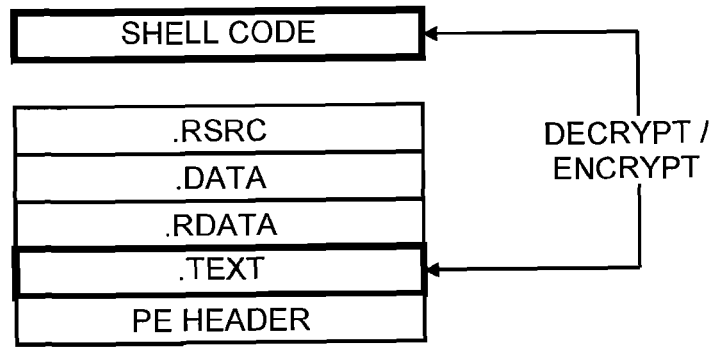
FIG. 3 illustrates boundaries between code sections of a shelled application, and encryption and decryption operations being performed in the shelled application.
Figure 5:
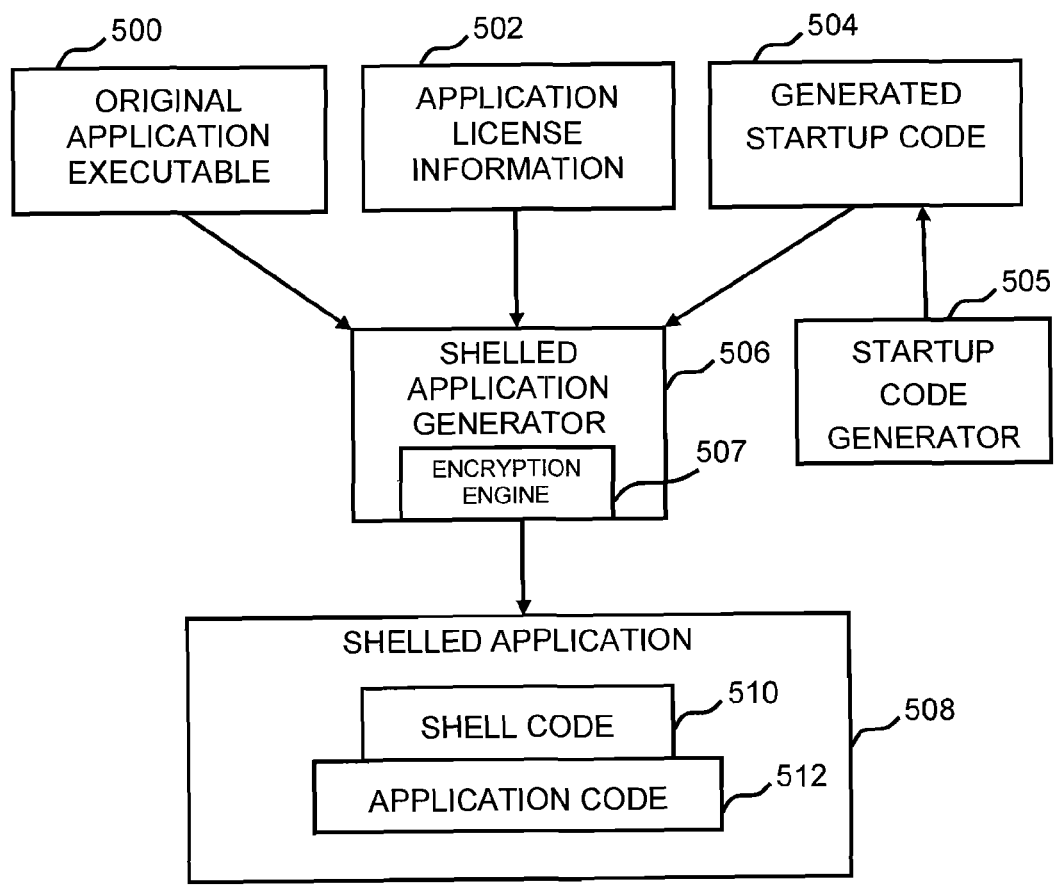
FIG. 5 is a diagram illustrating an exemplary shelling process used to protect a software application.

FIG. 5 is a diagram illustrating an exemplary computer-implemented software application protection system and shelling process. Startup code 504 is generated by startup code generator 505. Unprotected original application executable code 500, application license information 502, and the startup code 504, are provided to shelled application generator 506. The shelled application generator 506 generates therefrom a new, protected executable file as a shelled application 508. The startup code can be incorporated into a shell, and the license information embedded in the shell. The shell with embedded license information and the application executable are combined to form the shelled application 508, which comprises both the shell code 510 and the application code 512. In an implementation, the application executable can be encrypted by encryption engine 507 during the shelling process, so that the shelled application comprises an encrypted version of the application executable as application code 512. The license information can also be encrypted by the encryption engine 507, so that the shelled application comprises an encrypted version of the license information embedded in the shell code 510.

Figure 6:
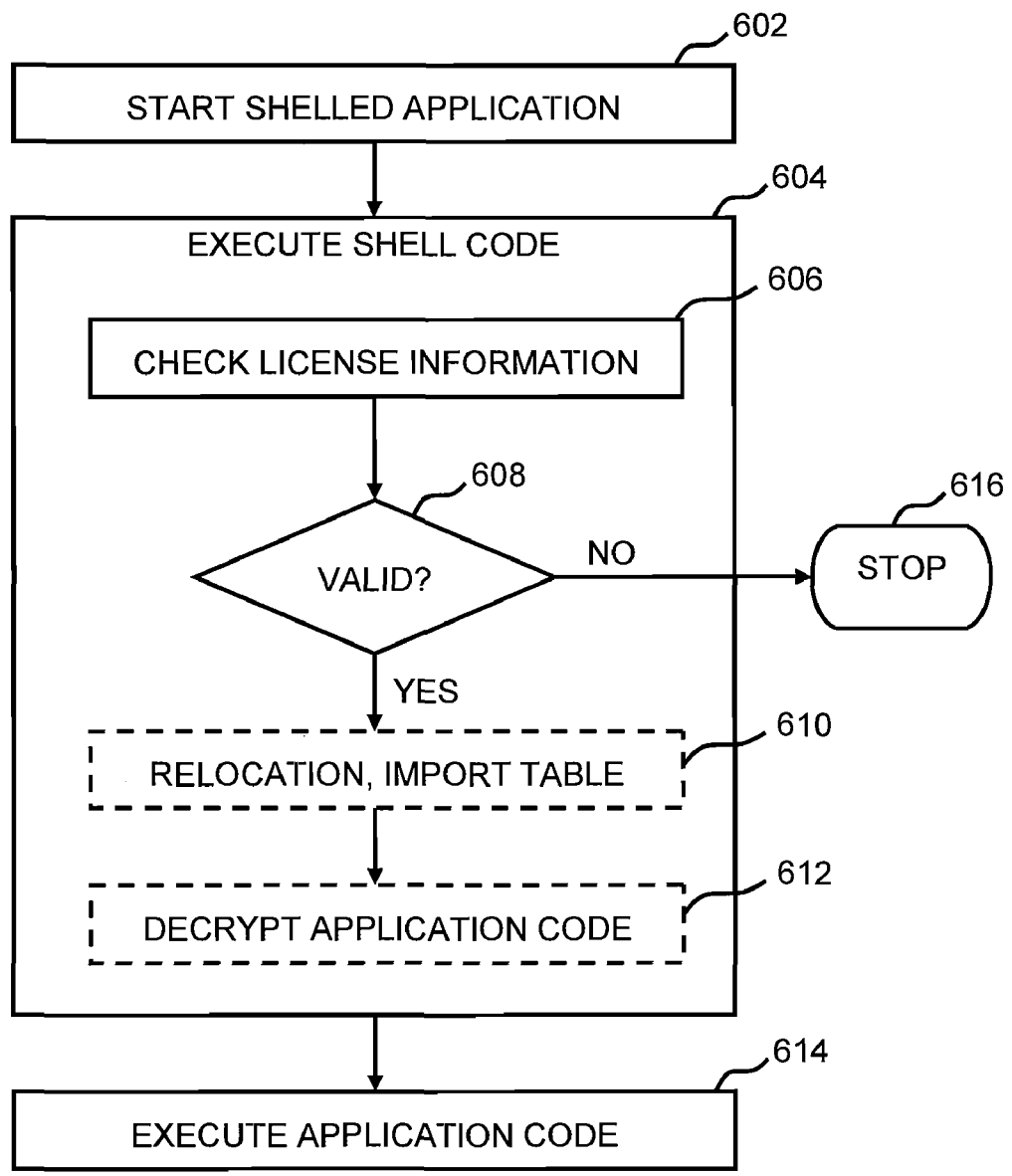
FIG. 6 is a diagram illustrating how a software application protected by the shelling process illustrated in FIG. 5 can be executed.

FIG. 6 is a flow diagram illustrating the execution of the shelled application 508. In block 602, execution of the shelled application 508 is initiated, and the shell code 510 is executed 604. The startup code in the shell 510 initiates one or more operations to determine whether execution of the application executable is authorized. In an implementation, the authorization process includes allowing the application to check for one or more valid license conditions 606. If execution of the protected executable is not authorized (e.g., the license information is not accessible and/or the shell provides an incorrect response to a request for licensing information), the execution of the shelled application 508 stops, as shown in blocks 608 and 616. If the licensing information is verified, the application code 512 is then executed, as shown in block 614. Other operations can also be performed if needed, such as relocating data link libraries (DLLs), setting up required import tables, and the like 610, and/or decrypting the application code 512 if encrypted to produce the executable application code, as shown in block 612.

Figure 7:
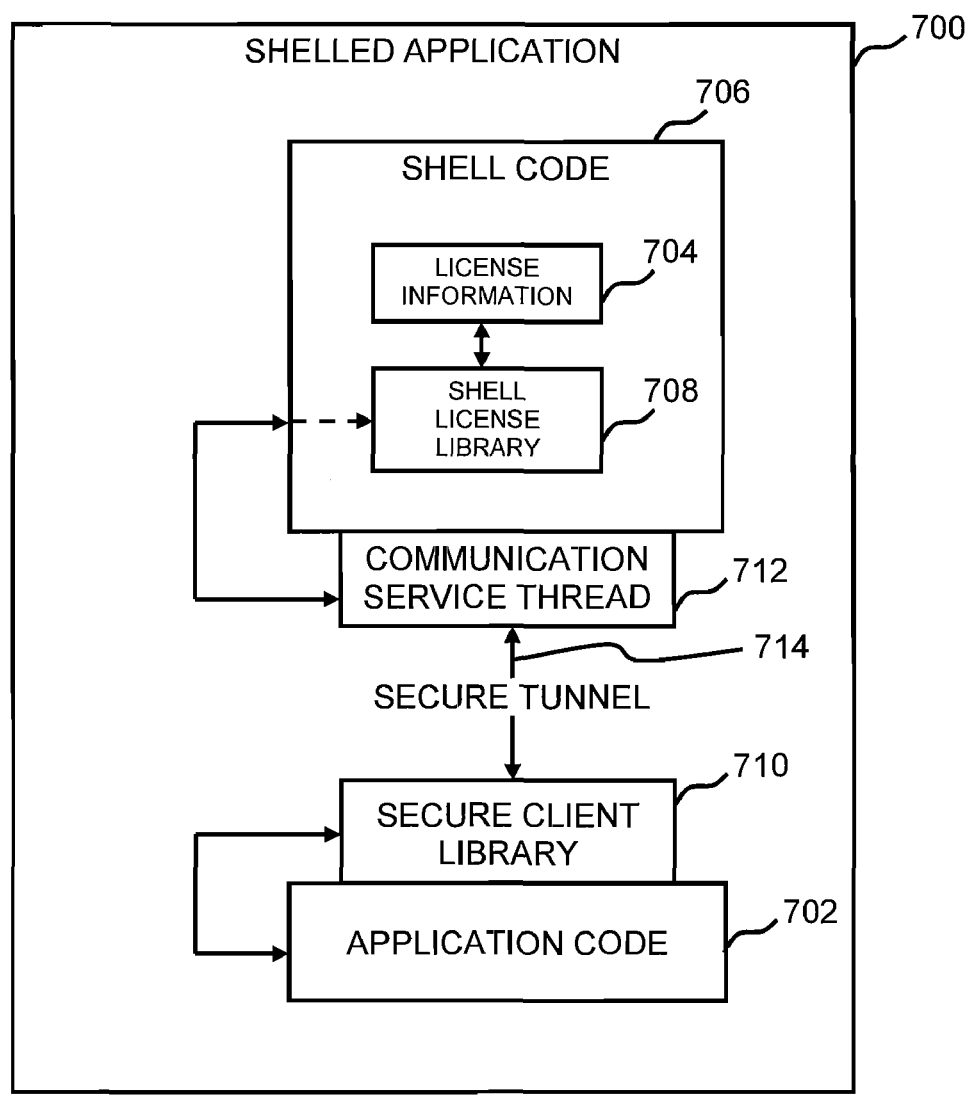
FIG. 7 shows a secure tunnel established between the shell code and the application code of a shelled application.

FIG. 7 shows a shelled application 700 in which the application code 702 accesses license information 704 embedded in shell code 706. As described previously, the license information 704 is embedded in the shell code 706 during the packing process, that is, during the generation of the shelled application 700. A shell license library 708 can be provided to the shell 706, comprising a set of APIs for use by the application 702 to access the license information 704. Before the shelling process is performed, software security modules, referred to as callable security checks, can be inserted into the application 702 to communicate with the shell 706, such as to make license information-related requests. The set of software security modules in the application constitute a secure client library 710. When the shelled application 700 is launched, it initiates a communication service thread 712, which handles license-related requests from the application. The application 702 uses the secure client library 710 to make calls to the APIs requesting licensing information 704. The communication service thread 712 accesses the shell license APIs in the shell license library 708, which accesses and returns the license information 704 as needed to satisfy the requests.

The license-related requests, responses, and other messages are sent between the application 702 and the shell 706. A secure tunnel 714 can be set up by the communication service thread between the application 702 and the shell 706. For example, the secure client library 710 may include one or more software security modules for secure communications. The shelled application 700 can include a pseudo-random number generator, and the secure client library 710 and/or the communication service thread 712 can generate therefrom randomized one-time session keys to secure messages communicated between the application and the shell via secure tunnel 714. The messages can use any appropriate interprocess communication (IPC) method, such as named pipes, TCP/IP, mailboxes, or the like.

In an exemplary embodiment, licensing information can comprise one or more features of various types, each feature comprising one or more elements. Illustratively, the feature types can include data, Elliptic Curve Cryptography (ECC), Advanced Encryption Standard (AES), and constraint features. Additional or other feature types may also be used.

Regarding the data feature type, an application developer can, for example, store data for use by the application into a data feature element, and the application can call an API to read the stored data, such as the exemplary SCL_FeatureRead API described below with other exemplary APIs. The ECC feature can contain an ECC private key, and can be used to sign message content using an elliptical curve signature scheme, such as ECCSH, for example. The application can call an API, such as SCL_FeatureSign, to sign message data, and then call another API such as SCL_FeatureVerify to verify the signature result in the application. Similarly, the AES feature can contain an AES algorithm key, and the application can call an API such as SCL_FeatureQuery to get a response, and compare the response with a previous response stored in the application. The application can also call APIs such as SCL_FeatureEncrypt and SCL_FeatureDecrypt to respectively encrypt and/or decrypt application data. Finally, the constraint feature provides licensing constraints, such as constraints that must be satisfied for the application to run or before certain application functionality can be used. Shell License APIs can be called by the application code to access the license information embedded in the shell code.

In an exemplary embodiment, such license information may be encoded in messages communicated between the shell code and the application code as type-length-value (TLV) elements of up to 256 bytes in length, within the data communication protocol used. Each such element contains only one piece of licensing information, or "constraint feature." The TLV elements comprise at least three kinds of fields: type, length, and value. The type field is a numeric code indicating the kind of licensing information represented by the element. The length field indicates the size of the element or the value field in bytes. The value field is a variable sized field which contains the licensing constraint feature information.

Additional fields can also exist in each licensing constraint element. FIG. 8 shows fields of an exemplary licensing constraint element. In addition to the type, length, and value fields described above, each element contains a feature ID field, and a check mark field. The feature ID field identifies the source of the information that the element represents. The check mark field is used to check data integrity. The license information embedded in the shell code may be encrypted when stored, and decrypted when accessed.

FIG. 9 lists exemplary feature types and IDs and associated feature descriptions that can be used as licensing constraints. As shown, three types of constraints are represented: locking constraints, environment constraints, and trial constraints. Each constraint can be used to prevent an application from launching or performing certain functions if the constraint is not satisfied. Locking constraints pertain to the computer on which the application is being run or its user, such as a user name, or the network card Media Access Control (MAC) address of a network card in the computer running the shelled application, or a processor ID, or disk serial number, etc. Environment constraints pertain to the operating environment in which the shelled application is being run, such as whether the presence of a debugger is detected. Trial constraints pertain to confining use of the shelled application to a trial usage period. The constraints listed in FIG. 9 are for illustration purposes, and other constraint types, IDs, and descriptions can also be used.

As previously described in connection with FIG. 7, the shell license library 708 comprises a set of APIs for use by the application 702 to access the license information 704. FIGS. 10A and 10B provide illustrative names and formats of exemplary APIs that can be called by the application to access the licensing information embedded in the shell code, as follows. In the illustrative API names, "SCL" is simply an abbreviation for Secure Client Library.

SCL_OpenLicense—this API can be used to create a secure tunnel between the shell code and the application code within the shelled application, and get a license handle. If it returns successfully, subsequent communication packets can be communicated via the secure tunnel. If the license has a constraint feature that cannot be satisfied, an error will be returned.

SCL_FeatureQuery—this API can be used to generate an encrypted response based on the Advanced Encryption Standard (AES) feature ID and the queried data.

SCL_FeatureRead—this API can be used to read data stored via the data feature.

SCL_FeatureEncrypt—this API can be used to encrypt provided cleartext data based on the AES feature ID.

SCL_FeatureDecrypt—this API can be used to decrypt provided cipher data based on the AES feature ID.

SCL_FeatureVerify—this API can be used to verify digitally signed content using the public key of the ECC feature based on the ECC feature ID.

SCL_FeatureSign—this API can be used to sign content using an algorithm based on the ECC feature ID.

SCL_CloseLicense—this API can be used to close the secure tunnel and release the license handle.

One benefit of the herein described systems and methods is that a virtual shell license can be supplied for testing purposes before the packing process. A virtual shell license is a kind of service that can emulate all shell license functions. During the debugging and developing process, the library can access this server, and after adding the shell, the library in the application can access the license in the shell code. In an exemplary operation, the herein described systems and methods can be used to make each shelled application instance unique, for example, via various compression or encryption methods and/or combinations. License information can also be encrypted using one or more vendor-related factors, such as a vendor ID or application name. License information can also be signed by one or more asymmetric algorithms.

In addition to the exemplary embodiments described above, various other modifications and variations can be made without departing from the spirit or scope of the invention. Thus, it is intended that the present invention cover all such modifications and variations provided they come within the scope of the appended claims and their equivalents.

What is claimed is:

1. A method of generating, from an original software application executable, a protected executable that includes the original application executable and license information for the application, the method comprising:

generating startup code for an original application to be protected;

obtaining computer executable code of the original application, and license information for the original application; and generating a protected application executable as a shelled application comprising the original application executable as application code, and a shell in which the license information is embedded and containing the startup code as shell code;

the shelled application comprising instructions for implementing a secure tunnel within the shelled application between the application code and the shell code, and instructions implementing at least one application programming interface (API) for the application code to access the license information in the shell code, whereby during execution the shelled application can perform a method comprising:

calling the API from the application code within the shelled application; generating secure communication session keys;

using the keys to establish a secure tunnel within the shelled application between the application code and the shell code; and communicating between the application code and the shell code using the secure tunnel;

whereby use of the original application can be authorized by the shelled application alone using the embedded license information after the shelled application is launched.

2. The method of claim 1, wherein the method performed by the shelled application further comprises launching a communication service thread to handle requests from the application code for license information, whereby the steps of generating session keys, using the keys to establish a secure tunnel, and communicating using the tunnel are handled by the service thread responsive to the API call.

3. The method of claim 1, wherein the communication protocol used by the secure tunnel comprises one of interprocess communication (IPC), Transmission Control Protocol/Internet Protocol (TCP/IP), named pipes, and mail slots.

4. The method of claim 1, wherein the step of creating the shelled application further comprises encrypting the license information.

5. The method of claim 4, wherein the encrypting step is accomplished using vendor-specific information.

6. The method of claim 5, wherein the vendor-specific information includes at least one of an application name and a unique vendor identifier (ID).

7. The method of claim 1, wherein the API is used to request a license handle; wherein, if the handle is successfully returned, at least one packet subsequently sent between the application and the shell is sent via the secure tunnel.

8. The method of claim 7, wherein the API is called to satisfy at least one license constraint and if the constraint is not satisfied, the handle is not returned and the API returns an error.

9. The method of claim 8, wherein the constraint is one of a user name, a system partition volume serial number, a network care media access control (MAC) address, a host name, an internet protocol (IP) address, a processor ID, an operating system (OS) install date/time, a universal serial bus (USB) storage type or serial number, a physical disk type or serial number, a video card type, a random access memory (RAM) size, a client time zone, detection of a virtual machine, detection of a terminal service, detection of a debugger, a trial use begin date, and a trial use end date.

10. A computer-implemented software application protection system for creating a shelled application comprising protected original application code and shell code containing embedded license information for the original application, the system comprising:

a processor executing code comprising:

a startup code generator for generating startup code; and a shelled application generator responsive to the startup code generator to generate a protected application executable as a shelled application generated from the startup code, an original software application executable, and application license information;

wherein the shelled application comprises the original software application executable as application code, and a shell containing the startup code and the license information as shell code; the shelled application further comprising a pseudo-random number generator and randomized one-time session keys generated by the pseudo-random number generator, said pseudo-random number generator and randomized one-time session keys establishing a secure tunnel within the shelled application between the application code and the shell code.

11. The software protection system of claim 10, wherein the application code of the shelled application calls at least one application programming interface (API), and the shell code comprises the called API and the API enables access to the license information.

12. The software protection system of claim 10, wherein the shelled application upon launch initiates a communication service thread responsive to at least one API call from the application code, the session keys establishing a secure tunnel within the shelled application between the application code and the shell code, the tunnel enabling communication of packets responsive to the API calls.

13. A computer readable non-transitory storage medium storing computer instructions which, when read by a computer, cause the computer to generate from an original software application executable a protected executable that includes the original application executable and license information for the application by a method comprising:
    generating shell code comprising startup information and license information for an original application to be protected;
    obtaining computer executable code of the original application; and
    creating a protected application executable as a shelled application comprising the original application executable as application code, and a shell in which the license information is embedded as shell code;
    the shelled application comprising instructions for implementing a secure tunnel within the shelled application between the application code and the shell code, and instructions implementing at least one application programming interface (API) for the application code to access the license information in the shell code, whereby during execution the shelled application can perform a method comprising:
    calling the API from the application code within the shelled application;
    generating secure communication session keys;
    using the keys to establish a secure tunnel within the shelled application between the application code and the shell code; and
    communicating between the application code and the shell code using the secure tunnel;
    whereby use of the original application can be authorized by the shelled application using the embedded license information after the shelled application is launched.

14. The computer readable non-transitory storage medium of claim 13, wherein the method performed by the shelled application further comprises launching a communication service thread to handle requests from the application code for license information, whereby the steps of generating session keys, using the keys to establish a secure tunnel, and communicating using the tunnel are handled by the service thread responsive to the call to the API.

15. The computer readable non-transitory storage medium of claim 13, wherein the communication protocol used by the secure tunnel is one of interprocess communication (IPC), Transmission Control Protocol/Internet Protocol (TCP/IP), named pipes, and mail slots.

16. The computer readable non-transitory storage medium of claim 13, wherein the method further comprises encrypting the license information.

* * * * *